US008195596B2

(12) United States Patent
Rose et al.

(10) Patent No.: US 8,195,596 B2
(45) Date of Patent: Jun. 5, 2012

(54) SYSTEMS, DEVICES, AND METHODS FOR INTERCONNECTED PROCESSOR TOPOLOGY

(75) Inventors: Geordie Rose, Vancouver (CA); Paul Bunyk, Vancouver (CA); Michael D. Coury, Vancouver (CA); William Macready, West Vancouver (CA); Vicky Choi, Vancouver (CA)

(73) Assignee: D-Wave Systems Inc., Burnaby (CA)

( * ) Notice: Subject to any disclaimer, the term of this patent is extended or adjusted under 35 U.S.C. 154(b) by 1182 days.

(21) Appl. No.: 12/013,192

(22) Filed: Jan. 11, 2008

(65) Prior Publication Data

US 2008/0176750 A1 Jul. 24, 2008

Related U.S. Application Data

(60) Provisional application No. 60/872,414, filed on Jan. 12, 2007, provisional application No. 60/956,104, filed on Aug. 15, 2007.

(51) Int. Cl.
*G06N 5/00* (2006.01)

(52) U.S. Cl. .......................................... 706/62; 706/45

(58) Field of Classification Search .............. 706/62, 706/45
See application file for complete search history.

(56) References Cited

U.S. PATENT DOCUMENTS

| 4,496,854 | A | 1/1985 | Chi et al. ................. 307/306 |
| 4,937,525 | A | 6/1990 | Daalmans .................. 324/248 |
| 5,128,675 | A | 7/1992 | Harada .................... 341/133 |
| 6,627,916 | B2 | 9/2003 | Amin et al. .................. 257/31 |
| 6,838,694 | B2 | 1/2005 | Esteve et al. ................. 257/34 |
| 7,133,888 | B2 | 11/2006 | Kohn et al. .................. 708/446 |
| 7,335,909 | B2 | 2/2008 | Amin et al. .................. 257/34 |
| 2003/0071258 | A1 | 4/2003 | Zagoskin et al. ............... 257/31 |
| 2003/0224753 | A1 | 12/2003 | Bremond et al. ............. 455/339 |
| 2005/0082519 | A1 | 4/2005 | Amin et al. .................. 257/13 |
| 2005/0224784 | A1 | 10/2005 | Amin et al. .................. 257/14 |
| 2005/0250651 | A1 | 11/2005 | Amin et al. ................. 505/846 |
| 2005/0256007 | A1 | 11/2005 | Amin et al. ................. 505/170 |
| 2006/0147154 | A1 | 7/2006 | Thom et al. ................... 385/37 |
| 2006/0225165 | A1 | 10/2006 | Maassen van den Brink et al. .......................... 977/933 |

FOREIGN PATENT DOCUMENTS

CA 2386426 A1 10/2000

OTHER PUBLICATIONS

SpringerLink, Neuro-Fuzzy Associative Machinery for Comprehensive Brain and Cognition Modelling, Studies in Computational Intelligence, Chapter 3 (Neuro—Dynamics, Synergetics and Synchronization), 2007, vol. 45/2007, 285-546.*
U.S. Appl. No. 60/917,884, filed May 14, 2007, Berkley et al.
U.S. Appl. No. 60/975,083, filed Sep. 25, 2007, Amin.
U.S. Appl. No. 60/975,487, filed Sep. 26, 2007, Maibaum et al.
U.S. Appl. No. 60/986,554, filed Nov. 8, 2007, Choi.
U.S. Appl. No. 11/950,276, filed Dec. 4, 2007, Berkley et al.
U.S. Appl. No. 12/017,995, filed Jan. 22, 2008, Harris.
U.S. Appl. No. 12/120,354, filed May 14, 2008, Bunyk et al.

(Continued)

*Primary Examiner* — Wilbert L Starks
(74) *Attorney, Agent, or Firm* — Seed IP Law Group PLLC

(57) ABSTRACT

An analog processor, for example a quantum processor may include a plurality of elongated qubits that are disposed with respect to one another such that each qubit may selectively be directly coupled to each of the other qubits via a single coupling device. Such may provide a fully interconnected topology.

34 Claims, 9 Drawing Sheets

OTHER PUBLICATIONS

U.S. Appl. No. 61/039,710, filed Mar. 25, 2008, Maibaum et al.
"A High-Level Look at Optimization: Past, Present and Future," e-Optimization.Community, May 2000, pp. 1-5.
Allen et al., "Blue Gene: A vision for protein science using a petaflop supercomputer," *IBM Systems Journal* 40(2): 310-327, 2001.
Amin et al., "Thermally assisted adiabatic quantum computation," arXiv:cond-mat/0609332v2, pp. 1-5, Mar. 2, 2007.
Averin et al., "Variable Electrostatic Transformer: Controllable Coupling of Two Charge Qubits," *Physical Review Letters* 91(5): 057003-1-057003-4, Aug. 1, 2003.
Blatter et al., "Design aspects of superconducting-phase quantum bits," *Physical Review B* 63: 174511-1-174511-9, 2001.
Bocko et al., "Prospects for Quantum Coherent Computation Using Superconducting Electronics," *IEEE Transactions on Applied Superconductivity* 7(2): 3638-3641, Jun. 1997.
Boyer et al., "On the Cutting Edge: Simplified $O(n)$ Planarity by Edge Addition," *Journal of Graph Algorithms and Applications* 8(3): 241-273, 2004.
Brennen et al., "Why should anyone care about computing with anyons?," arXiv:0704.2241v1 [quant-ph], pp. 1-12, Apr. 18, 2007.
Butcher, "Advances in persistent-current qubit research: Inductively coupled qubits and novel biasing methods," Final Report, Delft University of Technology, Faculty of Applied Sciences, pp. 1-50, Jan. 10, 2002.
Choudhury, *Handbook of Microlithography, Micromachining and Microfabrication vol. 1: Microlithography,* The International Society for Optical Engineering, Bellingham, WA, 1999.
Clarke et al., "Quiet Readout of Superconducting Flux States," *Physica Scripta.* T102: 173-177, 2002.
Cosmelli et al., "Controllable Flux Coupling for the Integration of Flux Qubits," arXiv:cond-mat/0403690v1, pp. 1-10, Mar. 29, 2004.
U.S. Appl. No. 12/109,847, filed Apr. 25, 2008, Berkley.
Deutsch, "Quantum theory, the Church-Turing principle and the universal quantum computer," Appeared in *Proceedings of the Royal Society of London A* 400: 97-117, 1985.
Dolan et al., "Optimization on the NEOS Server," from *SIAM News* 35(6): 1-5, Jul./Aug. 2002.
Farhi et al., "Quantum Adiabatic Evolution Algorithms versus Simulated Annealing," MIT-CTP #3228, arXiv:quant-ph/0201031 v1, pp. 1-16, Jan. 8, 2002.
Feynman, "Simulating Physics with Computers," *International Journal of Theoretical Physics* 21(6/7): 467-488, 1982.
Filippov et al., "Tunable Transformer for Qubits Based on Flux States," *IEEE Transactions on Applied Superconductivity* 13(2): 1-4, Jun. 2003.
Fourer et al., "Optimization as an Internet Resource," *INTERFACES* 31(2): 130-150, Mar.-Apr. 2001.
Friedman et al., "Quantum superposition of distinct macroscopic states," *Nature* 406: 43-46, Jul. 6, 2000.
Fritzsch et al., "SNS and SIS Josephson junctions with dimensions down to the sub-μm region prepared by an unified technology," *Supercond. Sci. Tech.* 12: 880-882, 1999.
Ghiu et al., "Asymmetric two-output quantum processor in any dimension," arXiv:quant-ph/0610138v1, pp. 1-8, Oct. 17, 2006.
Gutwenger et al., "Graph Drawing Algorithm Engineering with AGD,"in Diehl (ed.), *Lecture Notes in Computer Science 2269. Revised Lectures on Sofware Visualization, International Seminar,* Springer-Verlag, London, 2001, pp. 307-323.
Harris et al., "Sign and Magnitude Tunable Coupler for Superconducting Flux Qubits," *DWAVE/COUPLER-10,* arXiv:cond-mat/0608253 v1, Aug. 11, 2006.
Heckmann et al., "Optimal Embedding of Complete Binary Trees into Lines and Grids," in Schmidt and Berghammer (eds.), *Lecture Notes in Computer Science 570. Proceedings of the 17th International Workshop,* Springer-Verlag, London 1991, pp. 25-35.
Hillery et al., "Approximate programmable quantum processors," arXiv:quant-ph/0510161v1, pp. 1-7, Oct. 20, 2005.
Hioe and Goto, *Quantum Flux Parametron—A Single Quantum Flux Superconducting Logic Device,* World Scientific Publishing Co. Pte. Ltd., Singapore, pp. 23-43, 1991.
Il'ichev et al., "Continuous Monitoring of Rabi Oscillations in a Josephson Flux Qubit," *Physical Review Letters* 91(9): 097906-1-097906-4, week ending Aug. 29, 2003.
Kaiser et al., "Coherent Atomic Matter Waves: Proceedings of the Les Houches Summer School, Session LXXII in 1999," Springer-Verlag, New York, ISBN 286883499X, pp. 184-188, 294-295, 302-303.
Knysh et al., "Adiabatic Quantum Computing in systems with constant inter-qubit couplings," arXiv:quant-ph/0511131v2, pp. 1-10, Nov. 15, 2005.
Koch et al., "Model for 1/f Flux Noise in SQUIDs and Qubits," pp. 1-14, May 5, 2007.
Levinson, *Principles of Lithography,* The International Society for Optical Engineering, Bellingham, WA, 2001.
Levitov et al., "Quantum spin chains and Majorana states in arrays of coupled qubits," arXiv:cond-mat/0108266v2, pp. 1-7, Aug. 19, 2001.
Maassen van den Brink et al., "Mediated tunable coupling of flux qubits," *New Journal of Physics* 7: 1-18, 2005.
Madou, *Fundamentals of Microfabrication,* Second Edition, CRC Press LLC, Boca Raton, Florida, 2002.
Makhlin et al., "Quantum-state engineering with Josephson-junction devices," *Reviews of Modern Physics* 73(2): 357-400, Apr. 2001.
Mc Hugh et al., "A quantum computer using a trapped-ion spin molecule and microwave radiation," arXiv:quant-ph/0310015v2, pp. 1-9, Apr. 13, 2004.
Mooij et al., "Josephson Persistent-Current Qubit," *Science* 285: 1036-1039, Aug. 13, 1999.
Mutzel, "Optimization in graph drawing," in Pardalos and Resende (eds.), *Handbook of Applied Optimization,* Oxford University Press, New York, 2002, pp. 967-977.
Nielsen, "Cluster-State Quantum Computation," arXiv:quant-ph/0504097v2, pp. 1-15, Jul. 1, 2005.
Nielsen et al., *Quantum Computation and Quantum Information,* Cambridge University Press, Cambridge, 2000, Chapter 7, "Quantum computers: physical realization," pp. 277-352.
Nielsen et al., *Quantum Computation and Quantum Information,* Cambridge University Press, Cambridge, 2000, "7.8 Other implementation schemes," pp. 343-345.
Orlando et al., "Superconducting persistent-current qubit," *Physical Review B* 60(22): 15 398-15 413, Dec. 1, 1999.
Plourde et al., "Entangling flux qubits with a bipolar dynamic inductance," *Physical Review B* 70(140501-R): 1-4, 2004.
Ryan et al., "Characterization of complex quantum dynamics with a scalable NMR information processor," arXiv:quant-ph/0506085v2, pp. 1-4, Feb. 13, 2006.
Shields et al., "Area Efficient Layouts of Binary Trees on One, Two Layers," Parallel and Distributed Computing and Systems, Anaheim, California, 2001.
Shirts et al., "Computing: Screen Savers of the World Unite!," *Science Online* 290(5498): 1903-1904, Dec. 8, 2000.
Shnirman et al., "Quantum Manipulations of Small Josephson Junctions," *Physical Review Letters* 79(12): 2371-2374, Sep. 22, 1997.
Shoji et al., "New fabrication process for Josephson tunnel junctions with (niobium nitride, niobium) double-layered electrodes," *Appl. Phys. Lett.* 41(11): 1097-1099, Dec. 1, 1982.
Shor, "Introduction to Quantum Algorithms," AT&T Labs—Research, arXiv:quant-ph/0005003 v2, pp. 1-17, Jul. 6, 2001.
Thaker et al., "Quantum Memory Hierarchies: Efficient Designs to Match Available Parallelism in Quantum Computing," arXiv:quant-ph/0604070v1, 12 pages, Apr. 10, 2006.
Van Zant, *Microchip Fabrication,* Fourth Edition, McGraw-Hill, New York, 2000.
Vlasov, "Von Neumann Quantum Processors," arXiv:quant-ph/0311196v1, pp. 1-8, Nov. 27, 2003.
Williams et al., *Explorations in Quantum Computing,* Springer, New York, Dec. 12, 1997, Chapter 11, "How to Make a Quantum Computer," pp. 241-265.

\* cited by examiner

SYSTEMS, DEVICES, AND METHODS FOR INTERCONNECTED PROCESSOR TOPOLOGY

CROSS REFERENCE TO RELATED APPLICATIONS

This application claims benefit under 35 U.S.C. 119(e) to U.S. provisional patent application Ser. No. 60/872,414, filed Jan. 12, 2007 and U.S. provisional patent application Ser. No. 60/956,104, filed Aug. 15, 2007, which are incorporated herein by reference in their entirety.

BACKGROUND OF THE INVENTION

1. Field of the Invention

This disclosure is generally relates to analog computing and analog processors, for example, quantum computing and quantum processors.

2. Description of the Related Art

A Turing machine is a theoretical computing system, described in 1936 by Alan Turing. A Turing machine that can efficiently simulate any other Turing machine is called a Universal Turing Machine (UTM). The Church-Turing thesis states that any practical computing model has either the equivalent or a subset of the capabilities of a UTM.

A quantum computer is any physical system that harnesses one or more quantum effects to perform a computation. A quantum computer that can efficiently simulate any other quantum computer is called a Universal Quantum Computer (UQC).

In 1981 Richard P. Feynman proposed that quantum computers could be used to solve certain computational problems more efficiently than a UTM and therefore invalidate the Church-Turing thesis. See e.g., Feynman R. P., "Simulating Physics with Computers", International Journal of Theoretical Physics, Vol. 21 (1982) pp. 467-488. For example, Feynman noted that a quantum computer could be used to simulate certain other quantum systems, allowing exponentially faster calculation of certain properties of the simulated quantum system than is possible using a UTM.

Approaches to Quantum Computation

There are several general approaches to the design and operation of quantum computers. One such approach is the "circuit model" of quantum computation. In this approach, qubits are acted upon by sequences of logical gates that are the compiled representation of an algorithm. Circuit model quantum computers have several serious barriers to practical implementation. In the circuit model, it is required that qubits remain coherent over time periods much longer than the single-gate time. This requirement arises because circuit model quantum computers require operations that are collectively called quantum error correction in order to operate. Quantum error correction cannot be performed without the circuit model quantum computer's qubits being capable of maintaining quantum coherence over time periods on the order of 1,000 times the single-gate time. Much research has been focused on developing qubits with coherence sufficient to form the basic information units of circuit model quantum computers. See e.g., Shor, P. W. "Introduction to Quantum Algorithms", arXiv.org:quant-ph/0005003 (2001), pp. 1-27. The art is still hampered by an inability to increase the coherence of qubits to acceptable levels for designing and operating practical circuit model quantum computers.

Another approach to quantum computation, involves using the natural physical evolution of a system of coupled quantum systems as a computational system. This approach does not make critical use of quantum gates and circuits. Instead, starting from a known initial Hamiltonian, it relies upon the guided physical evolution of a system of coupled quantum systems wherein the problem to be solved has been encoded in the terms of the system's Hamiltonian, so that the final state of the system of coupled quantum systems contains information relating to the answer to the problem to be solved. This approach does not require long qubit coherence times. Examples of this type of approach include adiabatic quantum computation, cluster-state quantum computation, one-way quantum computation, quantum annealing and classical annealing, and are described, for example, in Farhi, E. et al., "Quantum Adiabatic Evolution Algorithms versus Stimulated Annealing" arXiv.org:quant-ph/0201031 (2002), pp 1-24.

Qubits

As mentioned previously, qubits can be used as fundamental units of information for a quantum computer. As with bits in UTMs, qubits can refer to at least two distinct quantities; a qubit can refer to the actual physical device in which information is stored, and it can also refer to the unit of information itself, abstracted away from its physical device.

Qubits generalize the concept of a classical digital bit. A classical information storage device can encode two discrete states, typically labeled "0" and "1". Physically these two discrete states are represented by two different and distinguishable physical states of the classical information storage device, such as direction or magnitude of magnetic field, current, or voltage, where the quantity encoding the bit state behaves according to the laws of classical physics. A qubit also contains two discrete physical states, which can also be labeled "0" and "1". Physically these two discrete states are represented by two different and distinguishable physical states of the quantum information storage device, such as direction or magnitude of magnetic field, current, or voltage, where the quantity encoding the bit state behaves according to the laws of quantum physics. If the physical quantity that stores these states behaves quantum mechanically, the device can additionally be placed in a superposition of 0 and 1. That is, the qubit can exist in both a "0" and "1" state at the same time, and so can perform a computation on both states simultaneously. In general, N qubits can be in a superposition of $2^N$ states. Quantum algorithms make use of the superposition property to speed up some computations.

In standard notation, the basis states of a qubit are referred to as the |0> and |1> states. During quantum computation, the state of a qubit, in general, is a superposition of basis states so that the qubit has a nonzero probability of occupying the |0> basis state and a simultaneous nonzero probability of occupying the |1> basis state. Mathematically, a superposition of basis states means that the overall state of the qubit, which is denoted |Ψ>, has the form |Ψ>=a|0>+b|1>, where a and b are coefficients corresponding to the probabilities $|a|^2$ and $|b|^2$, respectively. The coefficients a and b each have real and imaginary components, which allows the phase of the qubit to be characterized. The quantum nature of a qubit is largely derived from its ability to exist in a coherent superposition of basis states and for the state of the qubit to have a phase. A qubit will retain this ability to exist as a coherent superposition of basis states when the qubit is sufficiently isolated from sources of decoherence.

To complete a computation using a qubit, the state of the qubit is measured (i.e., read out). Typically, when a measurement of the qubit is performed, the quantum nature of the qubit is temporarily lost and the superposition of basis states collapses to either the |0> basis state or the |1> basis state and thus regaining its similarity to a conventional bit. The actual state of the qubit after it has collapsed depends on the probabilities $|a|^2$ and $|b|^2$ immediately prior to the readout operation.

Superconducting Qubits

There are many different hardware and software approaches under consideration for use in quantum computers. One hardware approach uses integrated circuits formed of superconducting materials, such as aluminum or niobium. The technologies and processes involved in designing and fabricating superconducting integrated circuits are similar to those used for conventional integrated circuits.

Superconducting qubits are a type of superconducting device that can be included in a superconducting integrated circuit. Superconducting qubits can be separated into several categories depending on the physical property used to encode information. For example, they may be separated into charge, flux and phase devices, as discussed in, for example Makhlin et al., 2001, *Reviews of Modern Physics* 73, pp. 357-400. Charge devices store and manipulate information in the charge states of the device, where elementary charges consist of pairs of electrons called Cooper pairs. A Cooper pair has a charge of 2e and consists of two electrons bound together by, for example, a phonon interaction. See e.g., Nielsen and Chuang, *Quantum Computation and Quantum Information*, Cambridge University Press, Cambridge (2000), pp. 343-345. Flux devices store information in a variable related to the magnetic flux through some part of the device. Phase devices store information in a variable related to the difference in superconducting phase between two regions of the phase device. Recently, hybrid devices using two or more of charge, flux and phase degrees of freedom have been developed. See e.g., U.S. Pat. No. 6,838,694 and U.S. Patent Application No. 2005-0082519.

Computational Complexity Theory

In computer science, computational complexity theory is the branch of the theory of computation that studies the resources, or cost, of the computation required to solve a given computational problem. This cost is usually measured in terms of abstract parameters such as time and space, called computational resources. Time represents the number of steps required to solve a problem and space represents the quantity of information storage required or how much memory is required.

Computational complexity theory classifies computational problems into complexity classes. The number of complexity classes is ever changing, as new ones are defined and existing ones merge through the contributions of computer scientists. The complexity classes of decision problems include:

1. P—The complexity class containing decision problems that can be solved by a deterministic UTM using a polynomial amount of computation time;
2. NP ("Non-deterministic Polynomial time")—The set of decision problems solvable in polynomial time on a non-deterministic UTM. Equivalently, it is the set of problems that can be "verified" by a deterministic UTM in polynomial time;
3. NP-hard (Nondeterministic Polynomial-time hard)—A problem H is in the class NP-hard if and only if there is an NP-complete problem L that is polynomial time Turing-reducible to H. That is to say, L can be solved in polynomial time by an oracle machine with an oracle for H;
4. NP-complete—A decision problem C is NP-complete if it is complete for NP, meaning that:
    (a) it is in NP and
    (b) it is NP-hard, i.e., every other problem in NP is reducible to it. "Reducible" means that for every problem L, there is a polynomial-time reduction, a deterministic algorithm which transforms instances $I \in L$ into instances $c \in C$, such that the answer to c is YES if and only if the answer to I is YES. To prove that an NP problem A is in fact an NP-complete problem it is sufficient to show that an already known NP-complete problem reduces to A.

Decision problems have binary outcomes. Problems in NP are computation problems for which there exists a polynomial time verification. That is, it takes no more than polynomial time (class P) in the size of the problem to verify a potential solution. It may take more than polynomial time, however, to find a potential solution. NP-hard problems are at least as hard as any problem in NP.

Optimization problems are problems for which one or more objective functions are minimized or maximized over a set of variables, sometimes subject to a set of constraints. For example, the Traveling Salesman Problem ("TSP") is an optimization problem where an objective function representing, for example, distance or cost, must be optimized to find an itinerary, which is encoded in a set of variables representing the optimized solution to the problem. For example, given a list of locations, the problem may consist of finding the shortest route that visits all locations exactly once. Other examples of optimization problems include Maximum Independent Set, integer programming, constraint optimization, factoring, prediction modeling, and k-SAT. These problems are abstractions of many real-world optimization problems, such as operations research, financial portfolio selection, scheduling, supply management, circuit design, and travel route optimization. Many large-scale decision-based optimization problems are NP-hard. See e.g., "*A High-Level Look at Optimization: Past, Present, and Future*" e-Optimization.com, 2000.

Simulation problems typically deal with the simulation of one system by another system, usually over a period of time. For example, computer simulations can be made of business processes, ecological habitats, protein folding, molecular ground states, quantum systems, and the like. Such problems often include many different entities with complex interrelationships and behavioral rules. In Feynman it was suggested that a quantum system could be used to simulate some physical systems more efficiently than a UTM.

Many optimization and simulation problems are not solvable using UTMs. Because of this limitation, there is need in the art for computational devices capable of solving computational problems beyond the scope of UTMs. In the field of protein folding, for example, grid computing systems and supercomputers have been used to try to simulate large protein systems. See Shirts et al., 2000, *Science* 290, pp. 1903-1904, and Allen et al., 2001, *IBM Systems Journal* 40, p. 310. The NEOS solver is an online network solver for optimization problems, where a user submits an optimization problem, selects an algorithm to solve it, and then a central server directs the problem to a computer in the network capable of running the selected algorithm. See e.g., Dolan et al., 2002, *SIAM News* Vol. 35, p. 6. Other digital computer-based systems and methods for solving optimization problems can be found, for example, in Fourer et al., 2001, *Interfaces* 31, pp. 130-150. All these methods are limited, however, by the fact they utilize digital computers, which are UTMs, and accordingly, are subject to the limits of classical computing that impose unfavorable scaling between problem size and solution time.

BRIEF SUMMARY OF THE INVENTION

In one aspect, an analog processor includes a plurality of quantum devices forming a fully interconnected topology of at least 5 quantum devices; and a plurality of controllable coupling devices wherein there exists a controllable coupling device between each pair of quantum devices in the plurality of quantum devices.

In one aspect, an analog processor includes a plurality of qubit devices; and a plurality of coupling devices, where at least one of the qubit devices is selectively directly coupleable to each of at least nine of the other qubit devices by respective single ones of the coupling devices.

In one aspect, an analog processor includes a plurality of qubit devices, each of the qubit devices having an elongated loop of superconducting material interrupted by at least one Josephson junction; and a plurality of coupling devices, each of the coupling devices operable to selectively couple a respective pair of the qubit devices, where at least one of the qubit devices is selectively directly coupleable to each of at least five nearest neighbor qubit devices as measured in a two dimensional plan view of the qubit devices by a respective single one of the coupling devices.

In one aspect, an analog processor includes a plurality of qubit devices, each of the qubit devices having an elongated loop of superconducting material interrupted by at least one Josephson junction; and a plurality of coupling devices, each of the coupling devices operable to selectively couple a respective pair of the qubit devices, where at least one of the qubit devices is selectively directly coupleable to each of at least three nearest neighbor qubit devices as measured in a two dimensional plan view of the qubit devices by a respective single one of the coupling devices where each of the respective single one of the coupling devices extend parallel to one another in the two dimensional plan view.

In the figures, identical reference numbers identify similar elements or acts. The sizes and relative positions of elements in the figures are not necessarily drawn to scale. For example, the shapes of various elements and angles are not drawn to scale, and some of these elements are arbitrarily enlarged and positioned to improve legibility. Further, the particular shapes of the elements as drawn are not intended to convey any information regarding the actual shape of the particular elements and have been solely selected for ease of recognition in the figures. Furthermore, while the figures may show specific layouts, one skilled in the art will appreciate that variations in design, layout, and fabrication are possible and the shown layouts are not to be construed as limiting the geometry of the present systems, devices, and methods.

DETAILED DESCRIPTION OF THE INVENTION

In the following description, some specific details are included to provide a thorough understanding of various disclosed embodiments. One skilled in the relevant art, however, will recognize that embodiments may be practiced without one or more of these specific details, or with other methods, components, materials, etc. In other instances, well-known structures associated with quantum processors, such as quantum devices, coupling devices, and control systems including microprocessors and drive circuitry have not been shown or described in detail to avoid unnecessarily obscuring descriptions of the embodiments of the systems, devices, and methods.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment," or "an embodiment," or "another embodiment" means that a particular referent feature, structure, or characteristic described in connection with the embodiment is included in at least one embodiment. Thus, the appearances of the phrases "in one embodiment," or "in an embodiment," or "another embodiment" in various places throughout this specification are not necessarily all referring to the same embodiment. Furthermore, the particular features, structures, or characteristics may be combined in any suitable manner in one or more embodiments.

It should be noted that, as used in this specification and the appended claims, the singular forms "a," "an," and "the" include plural referents unless the content clearly dictates otherwise. Thus, for example, reference to a problem-solving system including "a quantum processor" includes a single quantum processor, or two or more quantum processors. It should also be noted that the term "or" is generally employed in its sense including "and/or" unless the content clearly dictates otherwise.

Figure 1A:
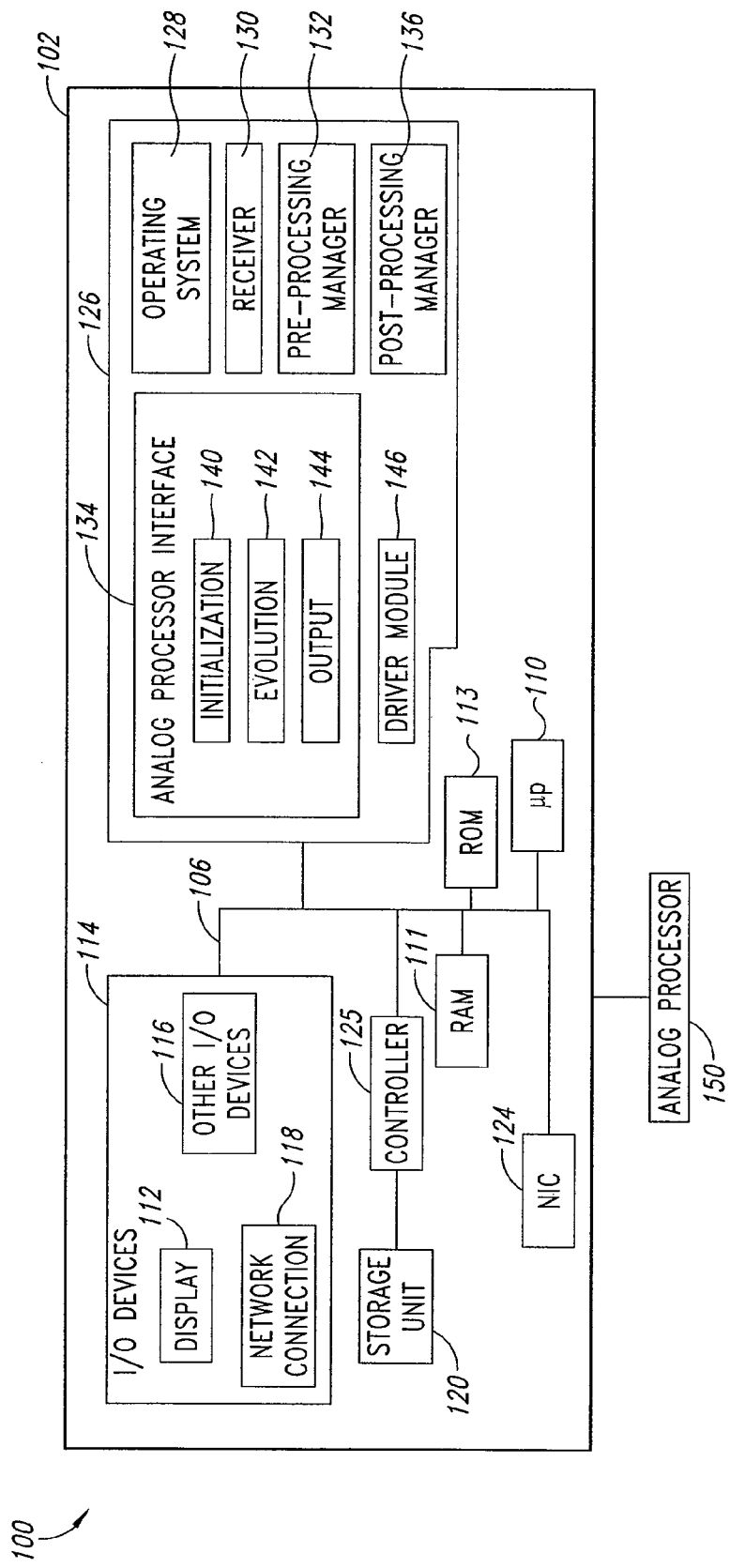
FIGS. 1A and 1B are functional diagrams showing systems for solving computational problems according to one illustrative embodiment.

The headings provided herein are for convenience only and do not interpret the scope or meaning of the embodiments.
Systems for Solving Computational Problems FIG. 1A shows an exemplary problem-solving system 100. Problem-solving system 100 may include a computer 102 and an analog processor 150. An analog processor is a processor that employs the fundamental properties of a physical system to find the solution to a computation problem. In contrast to a digital processor, which requires an algorithm for finding the solution followed by the execution of each step in the algorithm according to Boolean methods, analog processors do not involve Boolean methods.

Computer 102 may include one or more controllers such as microprocessor 110, non-volatile storage controller 125, digital signal processor (DSP) (not shown), analog processor 150, and the like. Computer 102 may further include one or more memories 126 coupled to controllers 110, 125, 150 by one or more busses 106. Examples of the one or more memories include a system memory 126, such as high speed random-access memory (RAM), for storing system control programs (e.g., operating system 128, application programs loaded from main non-volatile storage unit 120, data, and the like), and a read-only memory (ROM). Computer 102 may also include a main non-volatile storage unit 120, a user interface 114, a network interface card (NIC) 124, communication circuitry, a network connection 118, and the like. NIC 124, communication circuitry, network connection 118 and the like may provide one or more communication paths, for example allowing the system to communicate with one or more external devices (e.g., external computing systems, server computing systems, memories, etc). User interface 114 may also include one or more input devices 116 including a display 112, a mouse, a keyboard, and other peripheral devices.

Computer 102 may include an operating system 128 for handling various system services, such as file services, and for performing hardware dependent tasks. Examples of operating system 128 include UNIX, Windows NT, Windows XP, DOS, LINUX, VMX, and the like. Alternatively, no operating system 128 may be present and instructions may be executed, for example, in a daisy chain manner. In an embodiment, computer 102 may take the form of a digital computer. In another embodiment, analog processor 150 may be in communication with computer 102.

Figure 1B:
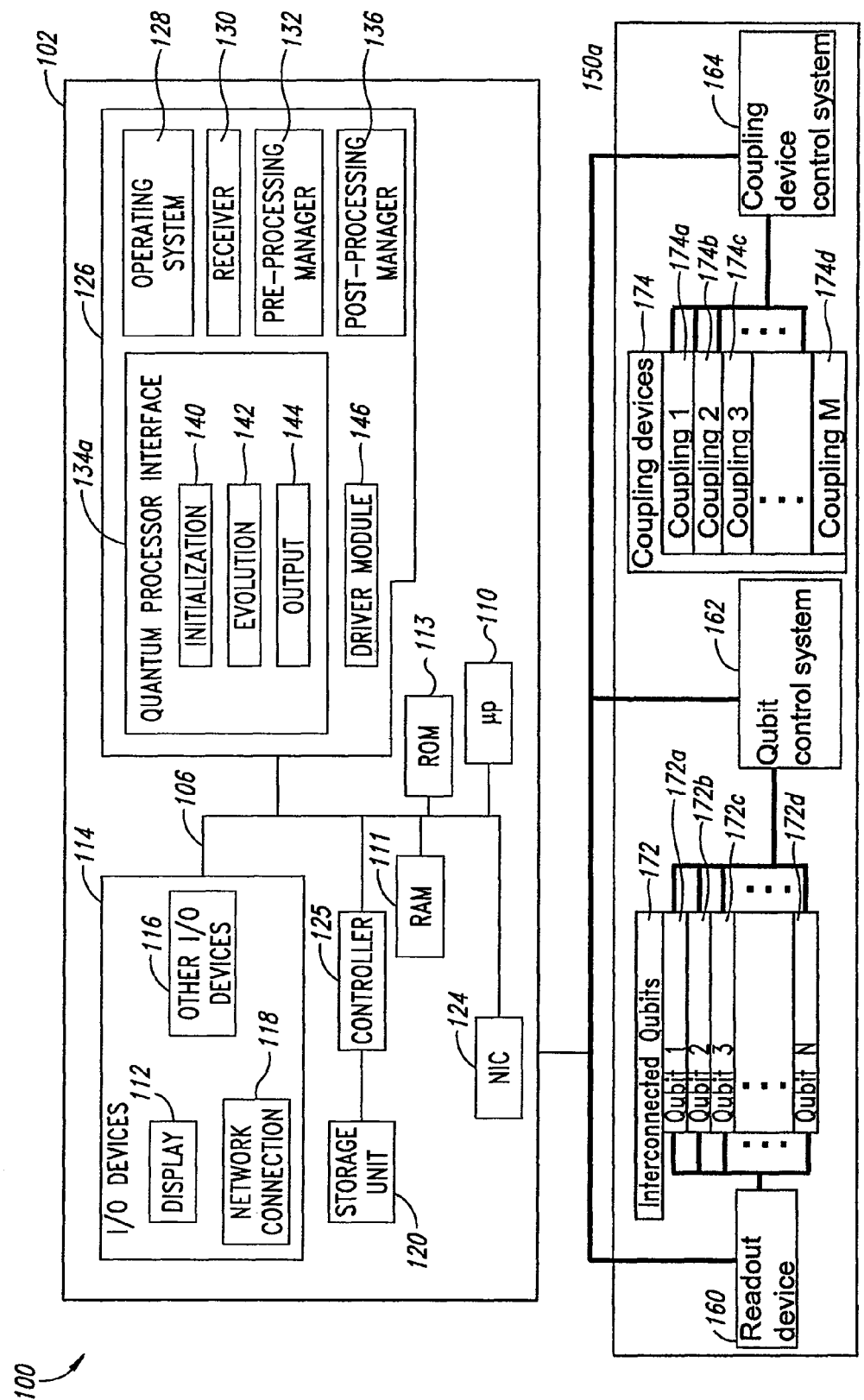

Analog processor 150 may take the form of quantum processor 150a shown in FIG. 1B, including a plurality of qubits 172a-172d (only four called out in figure) forming an interconnected topology, a plurality of coupling devices 174a-174d (only four called out in figure), a readout device 160, a qubit control system 162, and a coupling device control system 164. Quantum processor 150a may include at least two qubits 172a, 172b, at least one coupling device 174a, and at least one local bias device.

Interconnected topology of qubits 172, collectively, serve as the basis for performing quantum computation, and may take the form of superconducting qubits. Examples of qubits include quantum particles, atoms, electrons, photons, ions, and the like. Typical superconducting qubits, for example, have the advantage of scalability and are generally classified depending on the physical properties used to encode information including, for example, charge and phase devices, phase or flux devices, hybrid devices, and the like.

Quantum processor 150a may further include a readout device 160. Readout device 160 may include a plurality of dc-SQUID magnetometers, each inductively connected to a different qubit within interconnected topology 172. NIC 124 may be configured to receive a voltage or current from readout device 160. The dc-SQUID magnetometers including a loop of superconducting material interrupted by at least one Josephson junctions are well known in the art.

Qubit control system 162 may include one or more controllers for interconnected topology of qubits 172. Coupling device control system 164 may include one or more coupling controllers for the coupling devices, collectively 174. Each respective coupling controller in coupling device control system 164 may be configured to tune the coupling strength of a corresponding coupling device 174a-174d from zero to a maximum value. Coupling devices 174 may be tuned, for example, to provide ferromagnetic or anti-ferromagnetic coupling between qubits 172.

Problem-solving system 100 may further include a number of programs and data structures. Typically, some or all of the data structures and programs may be stored in one or more memories including system memory 126, random-access memory 111, read-only memory 113, and the like. Such may include storing information regarding at least one of: a coupling state corresponding to at least one of the controllable coupling devices or an initial basis state corresponding to at least one of the quantum devices. Likewise these programs and data structures or information may be processed using one or more microprocessors 110, analog processors 150, and the like. For ease of presenting the various features and advantages of the present systems, devices, and methods, however, such data structures, and programs are drawn as components of system memory 126. It will be appreciated, however, that at any given time the programs and data structures illustrated in system memory 126 or other information (e.g., information regarding at least one of: a coupling state corresponding to at least one of the controllable coupling devices or an initial basis state corresponding to at least one of the quantum devices) may be stored, for example, in non-volatile storage unit 120. In some embodiments, some or all of the data structures and programs may be stored on one or more remote computers not illustrated in FIG. 1A, provided that the one or more remote computers are addressable by computer 102, i.e., that there is some communication measure between the remote computer and computer 102 such that data can be exchanged among computers over, for example, a data network (e.g., the Internet, a serial connection, a parallel connection, Ethernet, and the like) using a communication protocol (e.g., FTP, telnet, SSH, IP, and the like). In some other embodiments, some or all of the data structures and programs may be redundantly stored and/or processed on one or more remote computers (not shown), provided that the one or more remote computers are addressable by computer 102.

Problem-solving system 100 may further include a receiver 130, a pre-processing manager 132, an analog processor interface 134 such as a quantum processor interface 134a, and a post-processing manager 136. Receiver 130 may be configured to receive problems to be solved on the analog processor 150. Receiver 130 may further be configured to send a response to a computational problem processing request.

In an embodiment, receiver 130, pre-processing manager 132, quantum processor interface 134a and post-processing manager 136 are all implemented in one or more digital computing systems. In another embodiment, at least one of receiver 130, pre-processing manager 132, quantum processor interface 134a, and post-processing manager 136 may be in a location remote from quantum processor 150a.

Microprocessor 110 may be configured to determine an estimate for producing one or more solutions to the computational problem processing requests based in part on a comparison to problems of like complexity.

Analog processor 150 may be operable to produce one or more solutions to computational problems identified by the computational problem processing requests. In some embodiments, analog processor 150 may be operable to obtain one or more solutions to the computational problems via a physical evolution of the analog processor. In another embodiment, problem-solving system 100 may include additional analog processors 150 operable to redundantly co-process one or more solutions to computational problems identified by the computational problem processing requests.

A computational problem may be received by the problem-solving system 100 via a telephone modem, a wireless modem, a local area network connection, a wide area network connection, a portable digital data device, and the like. The information received by receiver 130 may include initial values of couplings between qubits 172, local bias of qubits 172, run-time control parameters, and the like. Alternatively, the information received by receiver 130 may include a graph that represents a computational problem, macro-language instructions, such as AMPL, that define a computational problem, and the like.

Receiver 130 may be operable to provide instructions for scheduling a computation, as well as acquiring the solution to the problem. In an embodiment, a solution of the computation is collected as an output from quantum processor 150a. In another embodiment, receiver 130 may optionally include a graphical user interface (GUI), Command Line Interfaces (CLI), Text User Interface (TUI), and the like. In another embodiment, receiver 130 is operable to receive graphical representations of the computational problem.

Problem-solving system 100 may further include one or more communications links, such as, for example, a network connection 118, for sending and receiving data among at least two of receiver 130, pre-processing manager 132, quantum processor interface 134a, quantum processor 150a, and post-processing manager 136. The communications link may further include an encryption interface (not shown).

Pre-processing manager 132 may be configured to receive the computational problem processing request from receiver 130, and convert the computational problem processing requests into a first series of instructions. Pre-processing manager 132 may further be configured for determining a first Hamiltonian. In an embodiment, pre-processing manager 132 is configured for mapping a computational problem into a problem of an equivalent complexity class. In another embodiment, pre-processing manager 132 includes logic to map the computational problem into at least one of a problem of equivalent, greater or lesser complexity class. In an embodiment, the logic to map the computational problem onto analog processor 150 includes instructions for mapping the computational problem onto a topological representation and embedding the topological representation onto analog processor 150. In an embodiment, the topological representation is in a form of at least one of a planar graph or a non-planar graph. In another embodiment, the topological representation is a graph in the form of a plurality of vertices, and one or more edges. In another embodiment, the topological representation is an interconnected graph of the same structure had by the interconnected topology of qubits.

In another embodiment, pre-processing manager 132 is configured for mapping a computational problem onto analog processor 150, for example, quantum processor 150a. Mapping a computational problem onto analog processor 150 may include, for example, mapping the computational problem onto a graph and embedding the graph onto analog processor 150.

Quantum processor interface 134a may be operable to receive a first series of instructions from pre-processing manager 132. Quantum processor 150a may be configured to receive a second series of instructions from quantum processor interface 134a, and obtain a solution to the computational problem processing request by a physical evolution of the analog processor. Post-processing manager 136 may be configured to convert the solution into a post-processed solution.

Pre-processing manager 132 may include a mapper interface configured to map a computational problem to be solved into a corresponding problem description that is solvable by analog processor 150. The mapper interface may be configured to map problems from one graphical representation into a target graphical representation required for a specific configuration of analog processor 150. In an embodiment, the target graphical representation may include an interconnected topology, analog processor 150 may take the form of a quantum processor 150a that may include a lattice of qubits 172 and coupling devices 174, and each coupling device 174 may be configured to couple two qubits 172 together.

The mapper interface may be configured to map some NP problems (e.g., a mathematical problem such as Maximum Independent Set, Max Clique, Max Cut or k-SAT, or a problem such as an integer programming problem, a constraint optimization problem, a factoring problem, a prediction modeling problem, an operations research problem, a financial portfolio selection problem, a scheduling problem, a supply management problem, a circuit design problem, a travel route optimization problem, a business process simulation problem, an ecological habitat simulation problem, a protein folding simulation problem, a molecular ground state simulation problem or a quantum system simulation problem, and the like) into another NP problem, such as the Ising Spin Glass problem or other problems already mentioned.

Once the target graphical representation needed to solve a desired problem has been mapped by the mapper interface, quantum processor interface 134a is used to set up the coupling values and local bias values for coupling devices 174 and interconnected qubits 172 in order to map the representation onto quantum processor 150a. In an embodiment, three discrete program modules may provide the functions of quantum processor interface 134a: an initialization module 140, an evolution module 142, and an output module 144.

Initialization module 140 may be configured to determine the appropriate values of coupling $J_{ij}$ for coupling devices 174 and values of local bias $h_i$ for interconnected qubits 172. Initialization module 140 may be configured to convert aspects of a problem definition into physical values, such as coupling strength values and qubit bias values, which can be programmed into quantum processor 150a. Initialization module 140 may then be configured to send the appropriate signals along one or more internal buses 106 into NIC 124. NIC 124, in turn, may be configured to send such commands to qubit control system 162 and coupling device control system 164.

For any given problem, evolution module 142 may be configured to determine the appropriate values, at each point in time for the duration of the computation, of coupling $J_{ij}$ for coupling devices 174 and values of local bias $h_i$ for interconnected qubits 172 to fulfill some predetermined evolution schedule (i.e. the schedule for how the evolution is to take place). Once determined, the appropriate coupling device values and local bias values for an evolution schedule are sent as signals, via one or more buses 106, to NIC 124. NIC 124, in turn, is configured to send such commands to quantum device control system 162 and coupling device control system 164.

The computation of analog processor 150 may be configured to operate as, for example, an adiabatic evolution or an annealing evolution. An adiabatic evolution is the evolution used in adiabatic analog computing, and evolution module 142 may be configured to evolve the state of the analog processor 150 in accordance with the evolution used in adiabatic quantum computation. See, e.g., U.S. Patent Publication Nos. 2005-0256007, 2005-0250651, and 2005-0224784 each titled "Adiabatic Quantum Computation with Superconducting Qubits." Annealing is another form of evolution applicable to some analog processors 150, and evolution module 142 may be configured to evolve the state of analog processor 150 in accordance with annealing evolution.

Quantum processor 150a may be configured to solve a quantum problem based on signals provided by initialization module 140 and evolution module 142. Once the problem has been solved, the solution to the problem may be measured from the states of interconnected qubits 172 by readout device 160. Output module 144 may be configured in conjunction with readout device 160 to read this solution.

System memory 126 may further include a driver module 146 configured to output signals to analog processor 150. NIC 124 may be configured to interface with interconnected qubits 172 and coupling devices 174, either directly or through readout device 160, qubit control system 162, and/or coupling device control system 164. Alternatively, NIC 124 may include software and/or hardware that translates commands from driver module 146 into signals (e.g., voltages, currents) that are directly applied to interconnected qubits 172 and coupling devices 174. In an embodiment, NIC 124 may include software and/or hardware for translating signals (representing a solution to a problem or some other form of feedback) from interconnected qubits 172 and the coupling devices 174 such that output module 144 can interpret them. In some embodiments, initialization module 140, evolution module 142, and/or output module 144 may communicate with driver module 146, rather than directly with NIC 124, to send and receive signals from analog processor 150.

The functionality of NIC 124 can be divided into two classes: data acquisition and control. Different types of chips may be used to handle each discrete functional class. Data acquisition is used to measure physical properties of interconnected qubits 172 after quantum processor 150a has completed a computation. Such data can be measured using any number of customized or commercially available data acquisition micro-controllers including data acquisition cards manufactured by Elan Digital Systems (Fareham, UK) including the AD132, AD136, MF232, MF236, AD142, AD218, CF241 cards, and the like. Alternatively, a single type of microprocessor, such as the Elan D403C or D480C, may handle data acquisition and control. There may be multiple NICs 124 in order to provide sufficient control over interconnected qubits 172 and coupling devices 174 and in order to measure the results of a quantum computation on quantum processor 150a.

Computer 102 may further be configured for receiving a computational problem and transmitting the solution of a computational problem processed by analog processor 150 to another system, such as via a telephone modem, a wireless modem, a local area network (LAN) connection, a wide area network (WAN) connection, a portable digital data device, and the like. Computer 102 may be configured to generate a carrier wave embodying a data signal, with the solution to the computational problem processed by analog processor 150 embedded therein.

Analog processor 150 may be in the form of a superconducting quantum computer, examples of which include qubit registers, readout devices, and ancillary devices. Superconducting quantum computers normally are operated at milliKelvin temperatures and often are operated in a dilution refrigerator. An example of a dilution refrigerator is the Leiden Cryogenics B. V. MNK 126 series (Galgewater No. 21, 2311 VZ Leiden, The Netherlands). All or part of the components of quantum processor 150a may be housed in a dilution refrigerator. For example, qubit control system 162 and coupling device control system 164 may be housed outside a dilution refrigerator with the remaining components of quantum processor 150a being housed inside a dilution refrigerator.

Receiver 130, quantum processor interface 134a, and driver module 146, or any combination thereof, may be implemented via existing software packages. Suitable software packages include, for example, MATLAB (The MathWorks, Natick, Mass.), LabVIEW (National Instruments, Austin, Tex.), Maple (Waterloo Maple Inc., Waterloo, Ontario, Canada.), Mathematica (Wolfram Research, Inc., Champaign, Ill.), and the like.

In an embodiment, receiver 130 may be configured to receive a computational problem processing request, and to provide identity information indicative of an entity responsible (e.g., financially responsible) for the received computational problem processing request.

In an embodiment, the present systems, devices, and methods may be implemented as a computer program product that includes a computer program mechanism embedded in a computer readable storage medium. For example, the computer program product may include aspects of the quantum processor interface 134a, operating system 128, receiver 130, pre-processing manager 132, post-processing manager 136 and the like. Aspects of the various interfaces, managers, and modules, may be stored on a CD-ROM, DVD, magnetic disk storage product, any other computer readable data or program storage product, and may also be distributed electronically, via the Internet or otherwise, by transmission of a computer data signal (in which the software modules are embedded) embodied in a carrier wave, and the like.

In an embodiment, the problem-solving system 100 may include a microprocessor 110, a receiver 130, a pre-processing manager 136 and a quantum processor interface 134a. Receiver 130 may be configured to receive a computational problem processing request and provide identity information indicative of an entity responsible for the received computational problem processing request. Quantum processor interface 134a may be configured to convert the computational problem processing request into a series of instructions receivable by quantum processor 150a, to obtain a solution to the computational problem processing request, and/or to send a solution to the computational problem.

In other embodiments, problem-solving system 100 may include additional processors 110 configured to store execution data including processing variables, solution parameters, simulation trajectories, checkpoints, and the like throughout the processing of a computational problem processing request. For example, by storing execution data at predetermined times or after predetermined acts, it may be possible to return problem-solving system 100 to a predetermined point or checkpoint. Storing the execution data at predetermined times may include, for example, storing the execution data at regular intervals or according to a user-determined schedule.

In an embodiment, in the event that problem-solving system 100 experiences a power loss, and/or an application or the operating system stops performing its expected function and/or portions of an application or the operating system stop responding to other parts of the system, stored processing variables, solution parameters, simulation trajectories, and/or checkpoints, and the like may be used to return problem-solving system 100 to a predetermined point or checkpoint.

Interconnected Topology

Figure 2A:
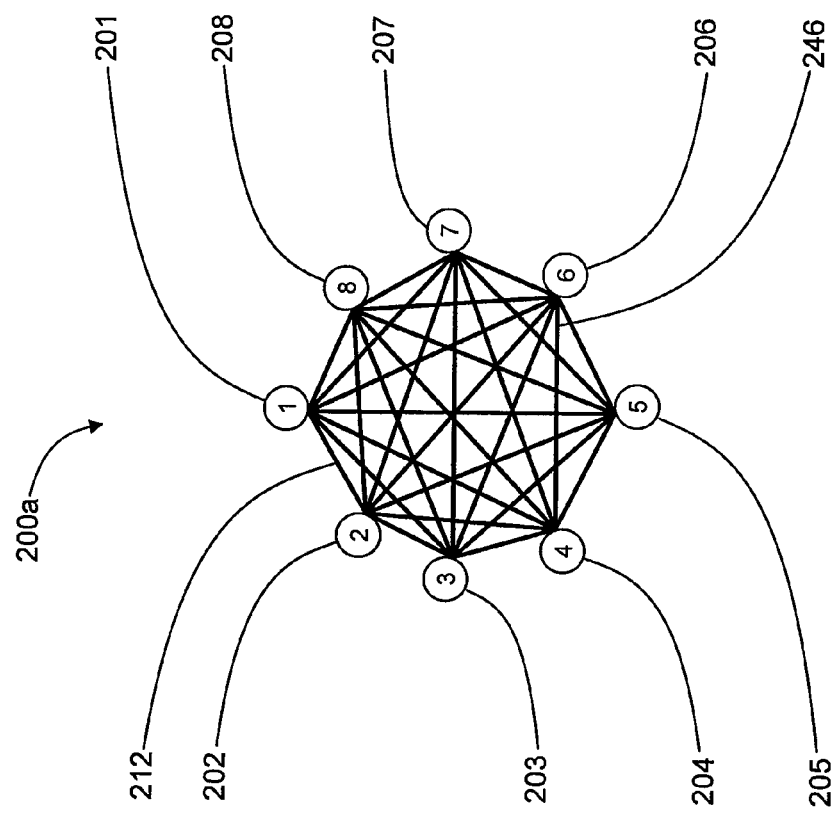
FIGS. 2A, 2B and 2C are a diagram of a source graph and two corresponding diagrams showing systems for solving computational problems according to two illustrative embodiments.
Figure 2B:
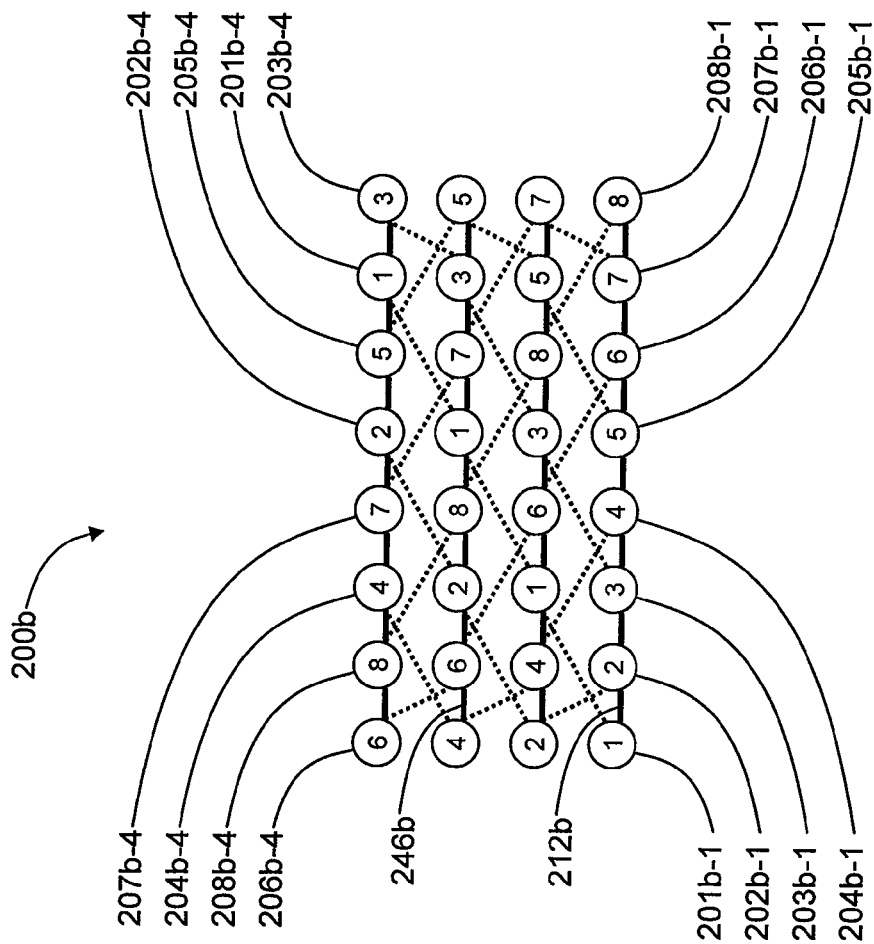
Figure 2C:
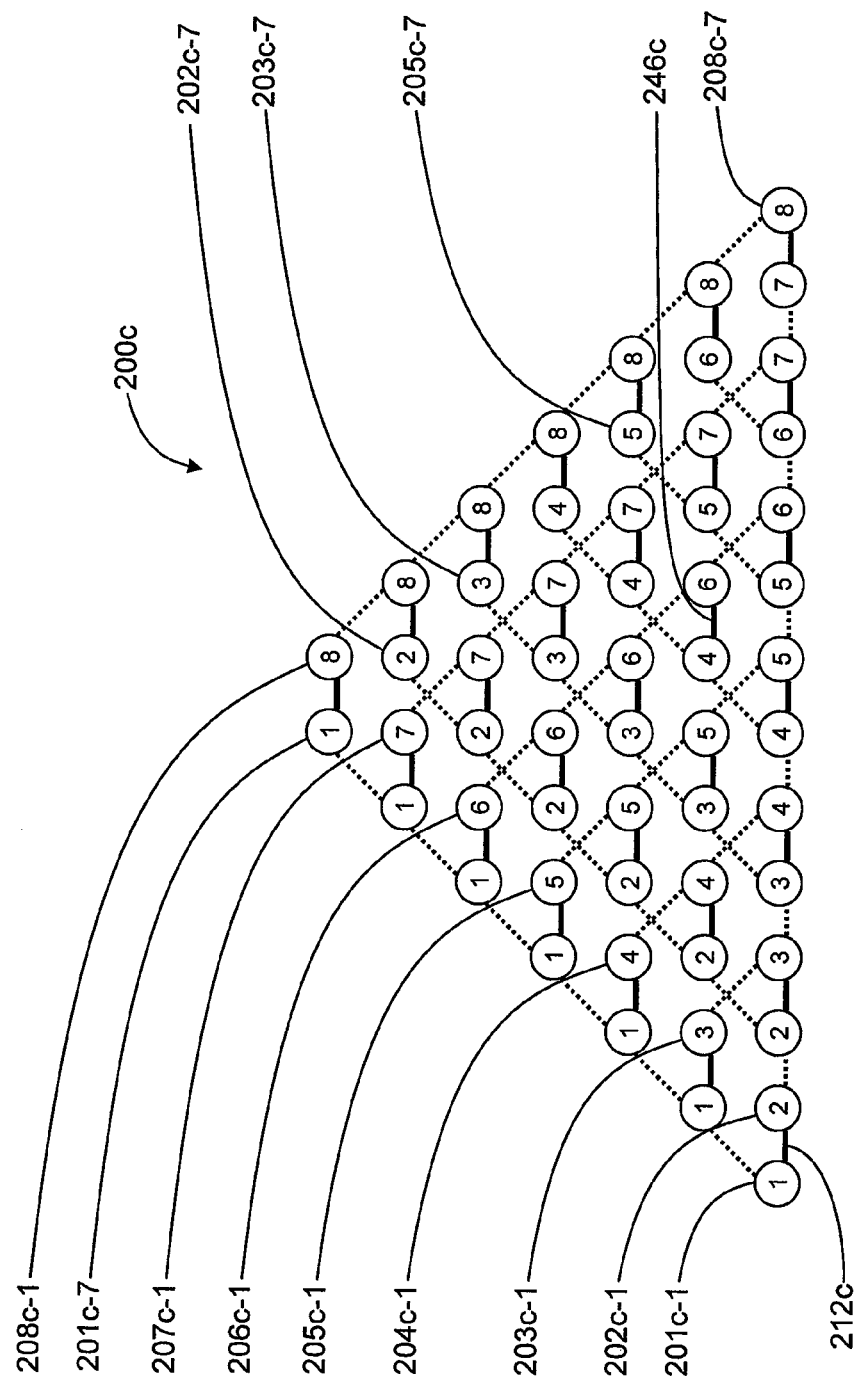

In some embodiments quantum devices are flux qubits which are loops of superconducting material. The actual shape of the loop is not important. This means that a roughly circular loop is no better or worse than an elongated "skinny" loop. Therefore, physically braiding the qubits so as to provide points of proximity between each pair of qubits in the processor can be done while still promoting the quantum properties of the quantum devices, and wherein the points of proximity define the nearest-neighbors of the quantum devices as measured in a two dimensional plan view of the qubit devices by a respective single one of the coupling devices. In some embodiments the points of proximity can contain couplers, and wherein the couplers extend parallel to one another in the two dimensional plan view. In some embodiments a coupler can be contained between all pairs of qubits in the processor thereby creating processor with a fully interconnected topology. All source graphs of a given magnitude can therefore be embedded into a fully interconnected topology if the fully interconnected topology has at least as many loops of superconducting material as there are nodes in the source graph. A complete graph with n vertices (denoted $K_n$) is a graph with n vertices in which each vertex is connected to each of the others (with one edge between each pair of vertices). In some embodiments the edge between each pair of vertices may be connected, empty or weighted. To embed a complete graph of n nodes of an analog processor as described herein requires that a controllable coupler exist between each quantum device existing within the analog processor. FIG. 2A shows a fully connected $K_8$ source graph 200a wherein each node in the source graph is connected to every other node in the source graph by an edge and wherein the source graph can be embedded into the fully connected topology 200b of FIG. 2B or 200c of FIG. 2C. FIG. 2B shows one embodiment of a two dimensional plan view of the interconnected topology. FIG. 2C shows a second embodiment of a two dimensional plan view of the interconnected topology.

Shown in FIG. 2B is an embodiment of a fully interconnected topology for eight qubits. The fully connected $K_8$ source graph 200a of FIG. 2A can be embedded into the topology 200b of FIG. 2B where each node 201-208 of FIG. 2A is assigned to a loop of superconducting material represented by four similarly labeled nodes in FIG. 2B. Node 201 of FIG. 2A is assigned to corresponding loop 201b-1 to 201b-4 in FIG. 2B. Node 202 of FIG. 2A is assigned to loop 202b-1 to 202b-4 in FIG. 2B. Node 203 of FIG. 2A is assigned to loop 203b-1 to 203b-4 in FIG. 2B. Similar assignments are completed for Nodes 204-208 of FIG. 2A into corresponding loops 204b-208b of FIG. 2B. Each inter-node relation in FIG. 2A is represented by a corresponding coupler in FIG. 2B. For example, inter-node relation 212 of FIG. 2A has a corresponding inter-quantum device coupling device 212b in FIG. 2B, and inter-node relation 246 of FIG. 2A has a corresponding inter-quantum device coupling device 246b of FIG. 2B.

In some embodiments the interweaving of the loops of superconducting material, as seen in FIG. 2B is done to produce two points of proximity between loops of superconducting material not at the perimeter of the processor, while the loops of superconducting material that are located at the outer perimeter of the processor are proximate to but one other loop of superconducting material. As is seen in the first row of FIG. 2B, loops 201b-1 and 208b-1 are proximate one other loop. In the case of 201b-1 this is 202b-1 and in the case of 208b-1 this is 207b-1. Loops 202b-1 to 207b-1 are proximate to two other loops in the first row. As the loops weave in the second, third and fourth rows of interconnected topology 200b we see that they weave in such a way that produces two points of proximity for all loops not on the perimeter of topology 200b and one point of proximity for all loops on the perimeter of topology 200a. In each point of proximity there is an inter-quantum device coupling device which facilitates controlled coupling between two quantum devices.

Shown in FIG. 2C is a further embodiment of a fully interconnected topology for eight qubits. Fully connected $K_8$ source graph 200a of FIG. 2A can be embedded into topology 200c of FIG. 2C where each node 201-208 of FIG. 2A is assigned to a loop of superconducting material represented by four similarly labeled nodes in FIG. 2C. Node 201 of FIG. 2A is assigned to corresponding loop 201c-1 to 201c-7 in FIG. 2C. Node 202 of FIG. 2A is assigned to loop 202c-1 to 202c-7 in FIG. 2B. Node 203 of FIG. 2A is assigned to loop 203c-1 to 203c-7 in FIG. 2B. Similar assignments are completed for Nodes 204-208 of FIG. 2A into corresponding loops 204c-208c of FIG. 2C. Each inter-node relation in FIG. 2A is represented by a corresponding coupler in FIG. 2C. For example, inter-node relation 212 of FIG. 2A has a corresponding inter-quantum device coupling device 212c in FIG. 2C, and inter-node relation 246 of FIG. 2A has a corresponding inter-quantum device coupling device 246c of FIG. 2C.

In some embodiments the interweaving of the loops of superconducting material, as seen in FIG. 2C is done to produce one or two points of proximity between each loop of superconducting material and one or two other loops of superconducting material in each row of the fully connected topology. As is seen in the first row of FIG. 2C, loops 201c-1 and 208c-1 are proximate one other loop. In the case of 201c-1 this is 202c-1 and in the case of 208c-1 this is 207c-1. Loops 202c-1 to 207c-1 are proximate to two other loops in the first row. As the loops weave in the second, third, fourth, fifth, sixth and seventh rows of interconnected topology 200c we see that they weave in such a way that produces one point of proximity between each loop of superconducting material and each other loop of superconducting material. In each point of proximity there is an inter-quantum device coupling device which facilitates controlled coupling between two quantum devices.

In some embodiments inter-node relations of FIG. 2A either exist, for example inter-node relations 212 and 246, or do not exist. In other embodiments, inter-node relations of FIG. 2A are weighted graphs and have weighted values of both positive and negative magnitudes relating the two nodes connected by the inter-node relation.

In some embodiments the inter-quantum device couplers have the ability to produce anti-ferromagnetic couplings and zero couplings between the two quantum devices the coupler acts. In other embodiments the inter-quantum device couplers have the ability to produce ferromagnetic couplings, anti-ferromagnetic couplings and zero couplings between the two quantum devices the coupler acts.

To represent an empty edge between a first node and a second node of a source graph, a coupling device between a first qubit device and a second qubit device in the interconnected topology respectively representing the first node and the second node is set to produce a zero coupling. To represent an edge connecting a third node and a fourth node of a source graph, a coupling device between a third qubit device and a fourth qubit device in the interconnected topology respectively representing the third node and the fourth node is set to produce a ferromagnetic coupling of a predetermined magnitude. To represent a weighted edge connecting a fifth node and a sixth node of a source graph, a coupling device between a fifth qubit device and a sixth qubit device in the interconnected topology respectively representing the fifth node and the sixth node is set to produce a ferromagnetic coupling of a magnitude proportional to the magnitude of the weighted edge.

In some embodiments there is a maximum number of couplers allowed per qubit corresponding to physical limitations exhibited by the qubit. Each loop 201b-208b in FIG. 2B is coupled to 7 loops. Each loop 201c-208c in FIG. 2C is coupled to 7 loops. In some embodiments the maximum number of coupling devices allowed per qubit is ten. Therefore, for a processor to be constructed with more than eleven loops to be built serially, ferromagnetically coupled loops of superconducting material will be constructed. By ferromagnetically coupling two loops of superconducting material together and since each loop has the ability to couple to ten loops, the total number of loops these two loops can couple to is eighteen, taking into account the ferromagnetic coupling used to couple the two loops together.

Figure 3A:
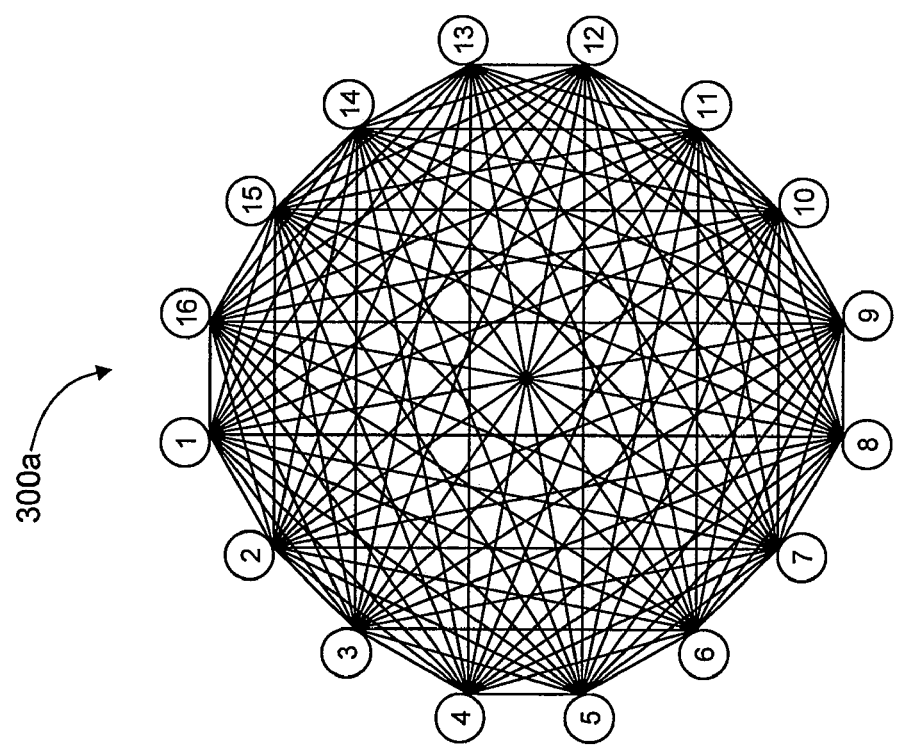
FIGS. 3A, 3B and 3C are a diagram of a source graph and two corresponding diagrams showing systems for solving computational problems according to two illustrative embodiments.

To embed source graph 300a of FIG. 3A into a fully interconnected topology the number of couplings required of each superconducting loop would be in excess of ten since each node of 300a is connected to fifteen other nodes.

Figure 3B:
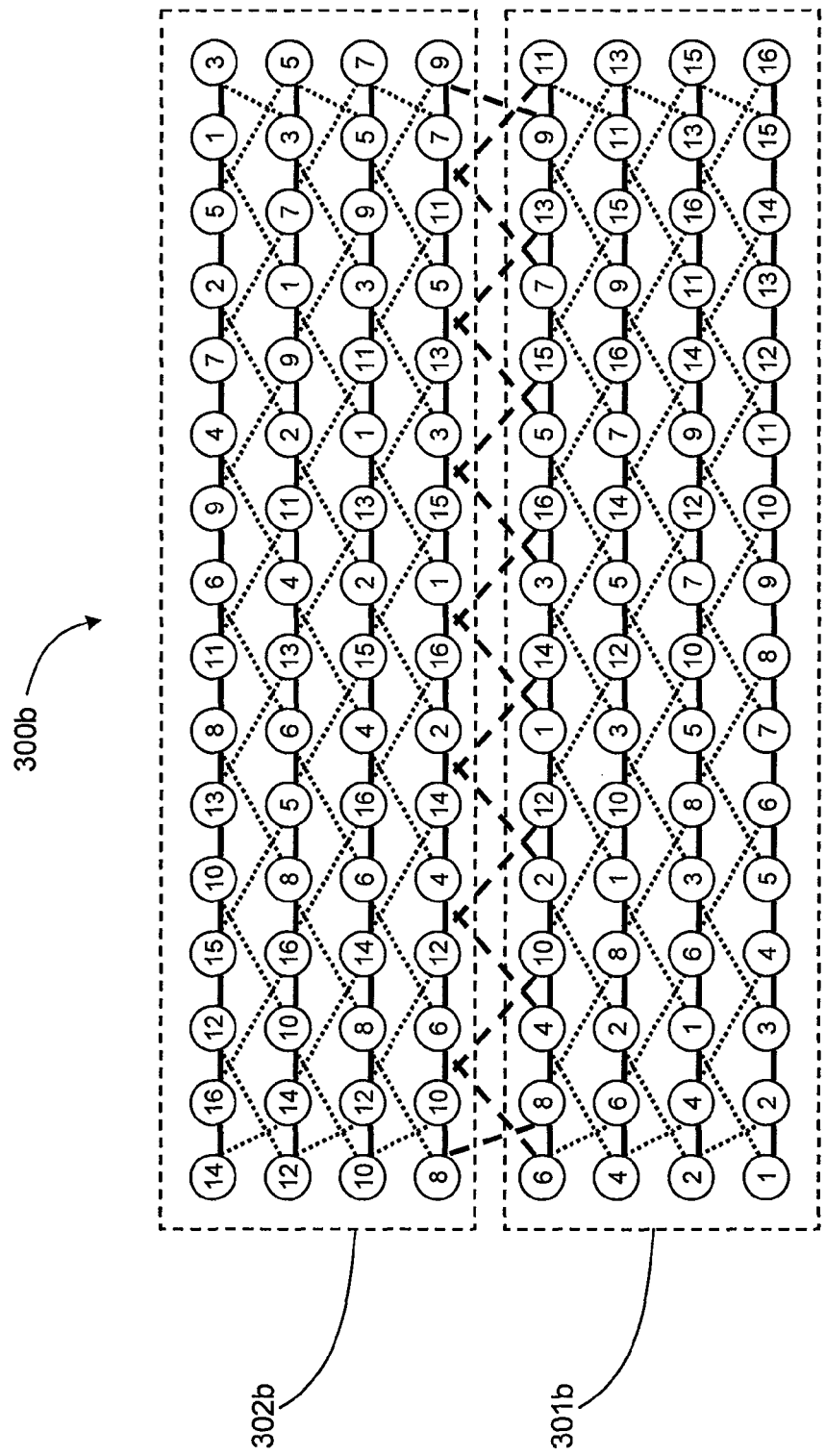

Fully interconnected topology 300b of FIG. 3B is capable of embedding source graph 300a into it. There are two processor blocks of qubits 301b, 302b in which there are each 16 loops of superconducting material where each loop of superconducting material is numbered 1 to 16. In one embodiment of the present systems, devices and methods, between processor block 301b and processor block 302b there exists ferromagnetic couplers connecting corresponding loops of superconducting material such that the quantum state of a loop of superconducting material in processor block 301b and the quantum state of a corresponding loop of superconducting material in processor block 302b will be equal. In a second embodiment, the couplers between first processor block 301b and second processor block 302b are tunable to be ferromagnetic couplings, anti-ferromagnetic couplings or zero-couplings. Noting the number of couplings each loop of superconducting material has will find that no loop has more than nine. FIG. 3B shows a further embodiment of a two dimensional plan view of the system.

Figure 3C:
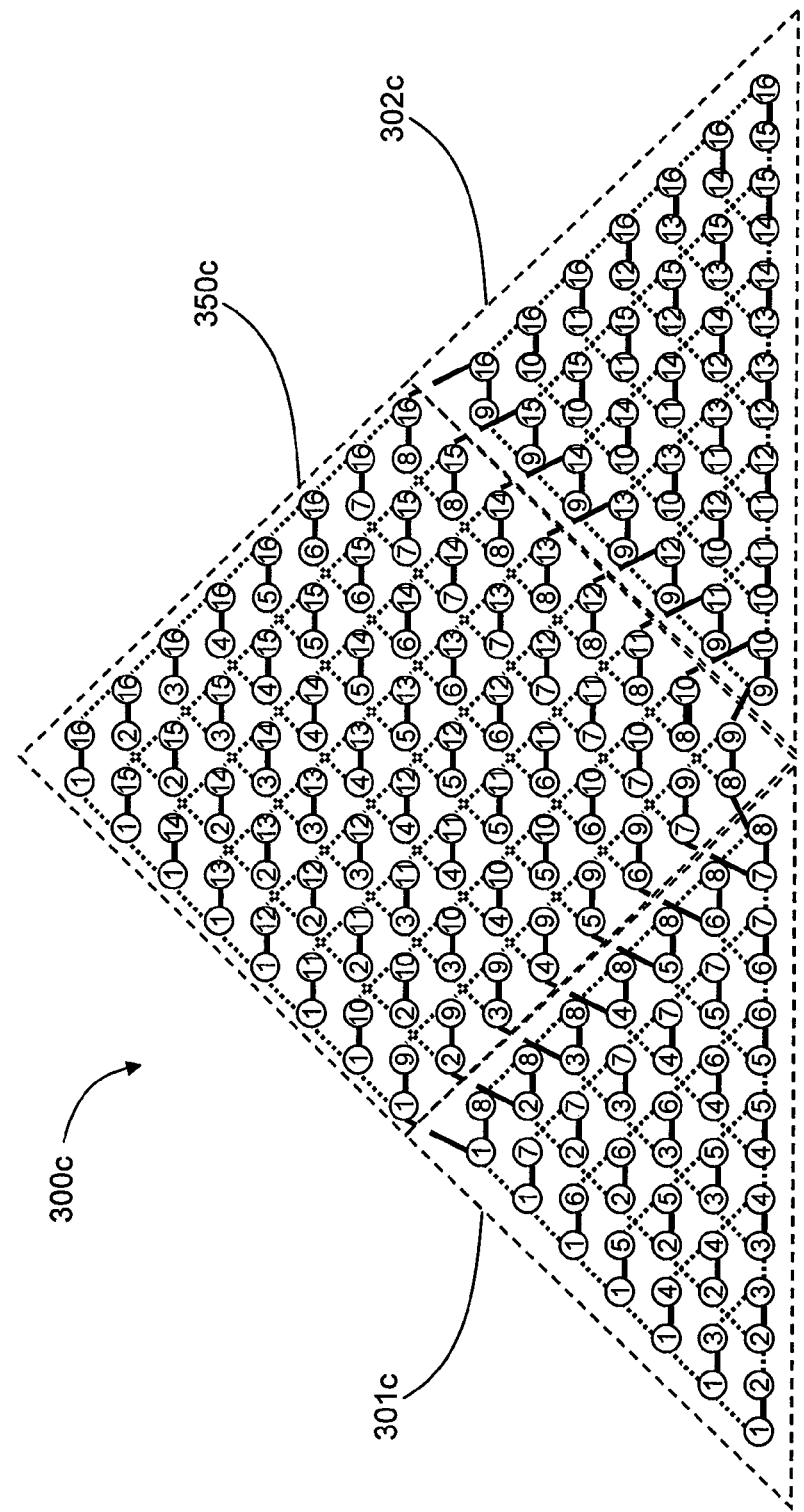

The fully interconnected topology 300c of FIG. 3C is capable of embedding source graph 300a into it. There are two processor blocks of qubits 301c, 302c and in each of which there are 8 fully interconnected loops of superconducting material where each loop of superconducting material in first block of qubits 301c is numbered 1 to 8 and where each loop of superconducting material in second block of qubits 302c is numbered 9 to 16. One would notice that each of the two processor blocks of qubits 301c and 302c are identical in structure to topology 200c. There is a third processor block of qubits 350c in which there exists a loop of superconducting material coupled to each of the qubits 1 to 16 of the two processor blocks of qubits 301c, 302c. In one embodiment of the present systems, devices and methods, between processor block 301c and processor block 350c and between processor block 302c and processor block 350c there exists ferromagnetic couplers connecting corresponding loops of superconducting material such that the quantum state of a loop of superconducting material in processor block 301c and the quantum state of a corresponding loop of superconducting material in processor block 350c will be equal. In a second embodiment, the couplers between processor block 301c and processor block 350c and the couplers between processor block 302c and processor block 350c are tunable to be ferromagnetic couplings, anti-ferromagnetic couplings or zero-couplings. The interconnected topology of the third block of qubits 350c is such that there exists a point of proximity between each of the qubits numbered 1 to 8 and each of the qubits numbered 9 to 16. There is no point of proximity between any qubit numbered 1 to 8 and any other qubit numbered 1 to 8 within the third processor block of qubits 350c. There is no point of proximity between any qubit numbered 9 to 16 and any other qubit numbered 9 to 16 within the third processor block of qubits 350c. Noting the number of couplings each loop of superconducting material has will find that no loop has more than nine. FIG. 3C shows a further embodiment of a two dimensional plan view of the system.

One of skill in the art would appreciated that for a source graph of arbitrary size n, additional n/8 processor blocks of qubits identical in structure to topology 200c could be added to the two dimensional plan of FIG. 3C with additional processor block of qubits of identical structure to processor block 350c placed to allow for the interconnection of each additional processor block of qubits identical in structure to topology 200c with each other additional processor block of qubits identical in structure to topology 200c.

In further embodiments to the present systems, devices and methods more than two processor blocks may be utilized to produce processors which are capable of embedding source graphs larger than $K_{16}$.

Embodiments of an Analog Processor

Figure 4:
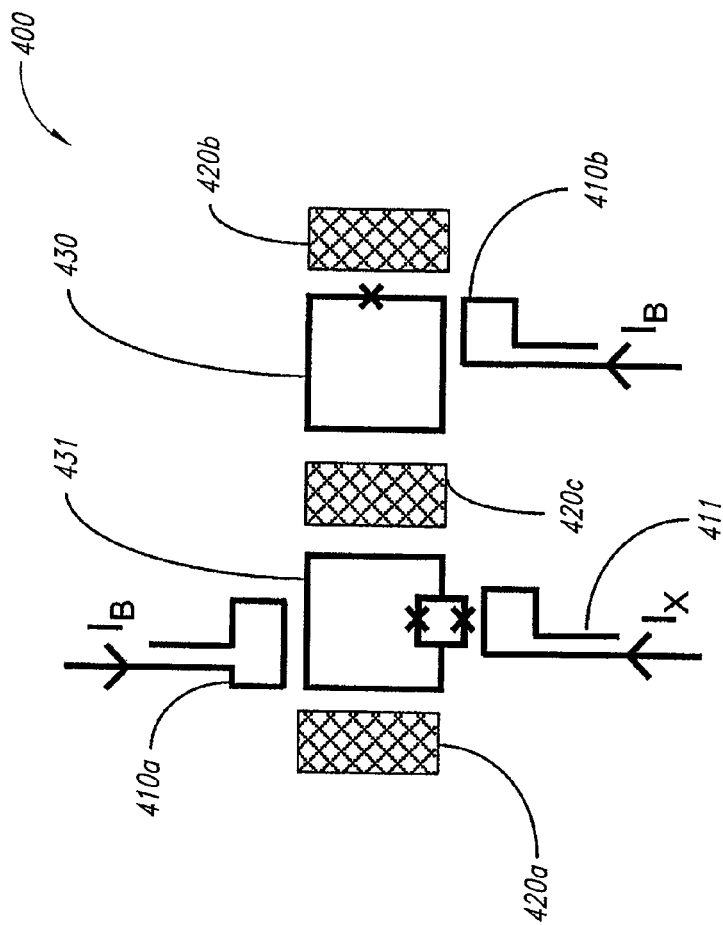
FIG. 4 is a schematic diagram showing a portion of an analog processor in the form of a quantum processor according to another illustrative embodiment.

FIG. 4 shows one example of a portion 400 of an analog processor 150 in the form of a quantum processor 150a. Quantum processor portion 400 includes two superconducting qubits 430 and 431. The two superconducting qubits include an rf-SQUID qubit 430 and an rf-SQUID qubit 431 with a compound junction (where a single Josephson junction is replaced by two parallel Josephson junctions). A coupling device 420c may couple qubits 430 and 431 together. Additional coupling devices 420a and 420b may couple qubits 430 and 431 to other qubits or devices (not shown). Qubits 430 and 431 may include a corresponding local bias device 410a and 410b, respectively. Qubit 431 may further include a compound Josephson junction bias device 411 which controls the tunneling rate of superconducting qubit 430. Quantum processor portion 400 is extendable to form, for example, an interconnected topology as seen in FIG. 2B and 3B. In an embodiment, a quantum processor 150a may include a plurality of superconducting devices, such as superconducting qubits 430 and 431, and one or more associated coupling devices 420a, 420b, and 420c. Quantum processor 150a may further include one or more local bias devices 410a and 410b and one or more compound Josephson junction bias devices 411. In an embodiment, quantum processor 150a may include at least two qubits in the form of qubit 430 or qubit 431, at least one coupling device in the form of 420a, 420b, or 420c, and at least one local bias device in the form of 410a or 410b.

Examples of superconducting qubits include superconducting flux qubits, superconducting charge qubits, and the like. See e.g., Makhlin et al., 2001, Reviews of Modern Physics 73, pp. 357-400. Examples of flux qubits that may be used include rf-SQUIDs, which include a superconducting loop interrupted by one Josephson junction, persistent current qubits, which include a superconducting loop interrupted by three Josephson junctions, and the like. See e.g., Mooij et al., 1999, Science 285, 1036; and Orlando et al., 1999, Phys. Rev. B 60, 15398. Other examples of superconducting qubits can be found, for example, in Il'ichev et al., 2003, Phys. Rev. Lett. 91, 097906; Blatter et al., 2001, Phys. Rev. B 63, 174511, and Friedman et al., 2000, Nature 406, 43. In addition, hybrid charge-phase qubits may also be used.

Superconducting coupling devices that may be used in the present devices and methods include rf-SQUIDs and dc-SQUIDs, which couple qubits together by flux. As described previously, SQUIDs include a superconducting loop interrupted by one Josephson junction (an rf-SQUID) or two Josephson junctions (a dc-SQUID). Coupling devices 420a, 420b, 420c may be capable of both ferromagnetic and anti-ferromagnetic coupling, depending on how the coupling device is being utilized within the interconnected topology. In the case of flux coupling, ferromagnetic coupling implies that parallel fluxes are energetically favorable and anti-ferromagnetic coupling implies that anti-parallel fluxes are energetically favorable. Alternatively, charge-based coupling devices may also be used. Other coupling devices can be found, for example, in U.S. patent application Ser. No. 11/247,857.

Local bias devices 410a, 410b may include a metal loop in proximity to a superconducting qubit that provides an external flux bias to the qubit. Local bias device 410a, 410b may also include a plurality of Josephson junctions. Again, each superconducting qubit in quantum processor 150a may have a corresponding local bias device or there may be fewer local bias devices than qubits 172. In some embodiments, charge-based local bias devices may be used.

There may exist readout devices, such as dc-SQUIDs, able to determine the quantum state of superconducting qubit 430, 431. Each superconducting qubit 430, 431 in quantum processor 150a may have a corresponding readout device or, alternatively, there may be fewer readout devices than qubits 430, 431.

As will be apparent to those skilled in the art, the various embodiments described above can be combined to provide further embodiments. Aspects of the present systems, devices, and methods can be modified, if necessary, to employ systems, methods, apparatus and concepts of the various patents, applications and publications to provide yet further embodiments of the systems, devices, and methods. For example, the various systems, devices, and methods may include a different number of metal or dielectric layers than set out in the illustrated embodiments, such as three or more metal layers and two or more insulating dielectric layers alternating with the metal layers, the layers may be disposed in a different order or area, or the embodiments may omit some elements, and/or employ additional elements.

These and other changes can be made to the present systems, devices, and methods in light of the above description. In general, in the following claims, the terms used should not be construed to limit the systems, devices, and methods to the specific embodiments disclosed in the specification and the claims, but should be construed to include all possible embodiments along with the full scope of equivalents to which such claims are entitled. Accordingly, the systems, devices, and methods is not limited by the disclosure, but instead its scope is to be determined entirely by the following claims.

We claim:

1. An analog processor system comprising:
   a plurality of quantum devices forming a fully interconnected topology of at least 5 quantum devices; and
   a plurality of controllable coupling devices wherein there exists a controllable coupling device between each pair of quantum devices in the plurality of quantum devices.

2. The analog processor system of claim 1 wherein each quantum device in the plurality of quantum devices is a loop of superconducting material, wherein the loop of superconducting material is interrupted by one or more Josephson junctions.

3. The analog processor system of claim 1 wherein each quantum device in the plurality of quantum devices has a first basis state and a second basis state.

4. The analog processor system of claim 1 wherein each quantum device in the plurality of quantum devices is a plurality of serially ferromagnetically coupled loops of superconducting material wherein each loop is interrupted by one or more Josephson junctions.

5. The analog processor system of claim 4 wherein each pair of ferromagnetically coupled loops of superconducting material in the plurality of serially ferromagnetically coupled loops of superconducting material are ferromagnetically coupled by means of an intra-quantum device coupling device.

6. The analog processor system of claim 5 where the intra-quantum device coupling device transmits flux produced by a first loop of superconducting material in the pair of ferromagnetically coupled loops of superconducting material to a second loop of superconducting material in the pair of ferromagnetically coupled loops of superconducting material.

7. The analog processor system of claim 5 wherein the intra-quantum device coupling device is a loop of superconducting material, wherein the loop of superconducting material is interrupted by at least one Josephson junction.

8. The analog processor system of claim 5 wherein the intra-quantum device coupling device ensures the first loop of superconducting material and the second loop of superconducting material coexist within one of the group of a first basis state and a second basis state.

9. The analog processor system of claim 1 wherein the interconnected topology is capable of embedding a $K_n$ source graph, wherein there exists an edge between each node in the $K_n$ source graph and wherein n is a number of quantum devices comprising the plurality of quantum devices.

10. The analog processor system of claim 9 wherein the edge between a first node and a second node of the $K_n$ source graph is represented by a first controllable coupling device between a first quantum device and a second quantum device.

11. The analog processor system of claim 9 wherein the edge between a first node and a second node is labeled.

12. The analog processor system of claim 9 wherein the edge between a third node and a fourth node is an empty edge.

13. The analog processor system of claim 1 wherein each controllable coupling device is capable of producing an anti-ferromagnetic coupling state between a pair of quantum devices or a zero coupling state between a pair of quantum devices.

14. The analog processor system of claim 1, further comprising:
   a memory that stores information regarding at least one of:
      a coupling state corresponding to at least one of the controllable coupling devices or an initial basis state corresponding to at least one of the quantum devices.

15. The analog processor system of claim 14 wherein there is at least one communication path connecting the memory with an external system.

16. The analog processor system of claim 15 wherein the external system stores information regarding at least one of: a coupling state corresponding to at least one of the controllable coupling devices or an initial basis state corresponding to at least one of the quantum devices.

17. The analog processor system of claim 14 wherein at least a portion of the memory is superconducting.

18. The analog processor system of claim 14 wherein the initial basis state corresponds to at least a part of a known initial Hamiltonian wherein the known initial Hamiltonian is a mathematical description of a problem to be solved by the analog processor.

19. The analog processor system of claim 1 wherein each quantum device in the plurality of quantum devices is selected from the group consisting of superconducting flux qubits, superconducting charge qubits, superconducting phase qubits and superconducting hybrid qubits.

20. An analog processor system, comprising:
   a plurality of qubit devices; and
   a plurality of coupling devices, where at least one of the qubit devices is selectively directly coupleable to each of at least nine of the other qubit devices by respective single ones of the coupling devices.

21. The analog processor system of claim 20 wherein each of the qubit devices comprises a first elongated loop of superconducting material interrupted by at least one Josephson junction.

22. The analog processor system of claim 21 wherein each of the qubit devices further comprises a second elongated loop of superconducting material interrupted by at least one Josephson junction, and wherein each first elongated loop is ferromagnetically coupled to the second elongated loop by means of a coupling loop of superconducting material interrupted by at least one Josephson junction.

23. The analog processor system of claim 21 wherein each of the qubit devices further comprises a sequence of elongated loops of superconducting material, and wherein each first elongated loop is ferromagnetically coupled to the sequence of elongated loops by means of a coupling loop of superconducting material interrupted by at least one Josephson junction.

24. The analog processor system of claim 23 wherein each loop in the sequence of elongated loops is interrupted by at least on Josephson junction.

25. The analog processor system of claim 23 wherein at least one of the elongated loops in the sequence of elongated loops is directly ferromagnetically coupled to a preceding one of the elongated loops in the sequence of elongated loops and is directly ferromagnetically coupled to a following one of the elongated loops in the sequence of elongated loops.

26. The analog processor system of claim 20 wherein each qubit device exists in either a first basis state or a second basis state.

27. The analog processor system of claim 20, further comprising:
 a memory that stores information regarding at least one of:
  a coupling state corresponding to at least one of the coupling devices or an initial basis state corresponding to at least one of the qubit devices.

28. The analog processor system of claim 27 wherein there is at least one communication path connecting the memory with an external system.

29. The analog processor system of claim 28 wherein the external system stores information regarding at least one of: a coupling state corresponding to at least one of the controllable coupling devices or an initial basis state corresponding to at least one of the quantum devices.

30. The analog processor system of claim 27 wherein at least a portion of the memory administration system is superconducting.

31. The analog processor system of claim 27 wherein the initial basis state corresponds to at least a part of a known initial Hamiltonian wherein the known initial Hamiltonian is a mathematical description of a problem to be solved by the analog processor.

32. The analog processor system of claim 20 wherein each qubit device in the plurality of quantum devices is selected from the group consisting of superconducting flux qubits, superconducting charge qubits, superconducting phase qubits and superconducting hybrid qubits.

33. An analog processor, comprising:
 a plurality of qubit devices, each of the qubit devices having an elongated loop of superconducting material interrupted by at least one Josephson junction; and
 a plurality of coupling devices, each of the coupling devices operable to selectively couple a respective pair of the qubit devices, where at least one of the qubit devices is selectively directly coupleable to each of at least five nearest neighbor qubit devices as measured in a two dimensional plan view of the qubit devices by a respective single one of the coupling devices.

34. An analog processor, comprising:
 a plurality of qubit devices, each of the qubit devices having an elongated loop of superconducting material interrupted by at least one Josephson junction; and
 a plurality of coupling devices, each of the coupling devices operable to selectively couple a respective pair of the qubit devices, where at least one of the qubit devices is selectively directly coupleable to each of at least three nearest neighbor qubit devices as measured in a two dimensional plan view of the qubit devices by a respective single one of the coupling devices where each of the respective single one of the coupling devices extend parallel to one another in the two dimensional plan view.

\* \* \* \* \*